Feb. 6, 1962 J. McREAVY 3,019,527
CHEESE MANUFACTURING MACHINE
Filed April 8, 1958 5 Sheets-Sheet 2

INVENTOR
JAMES McREAVY
BY McMorrow, Berman & Davidson
ATTORNEYS

Feb. 6, 1962 J. McREAVY 3,019,527
CHEESE MANUFACTURING MACHINE
Filed April 8, 1958 5 Sheets-Sheet 3
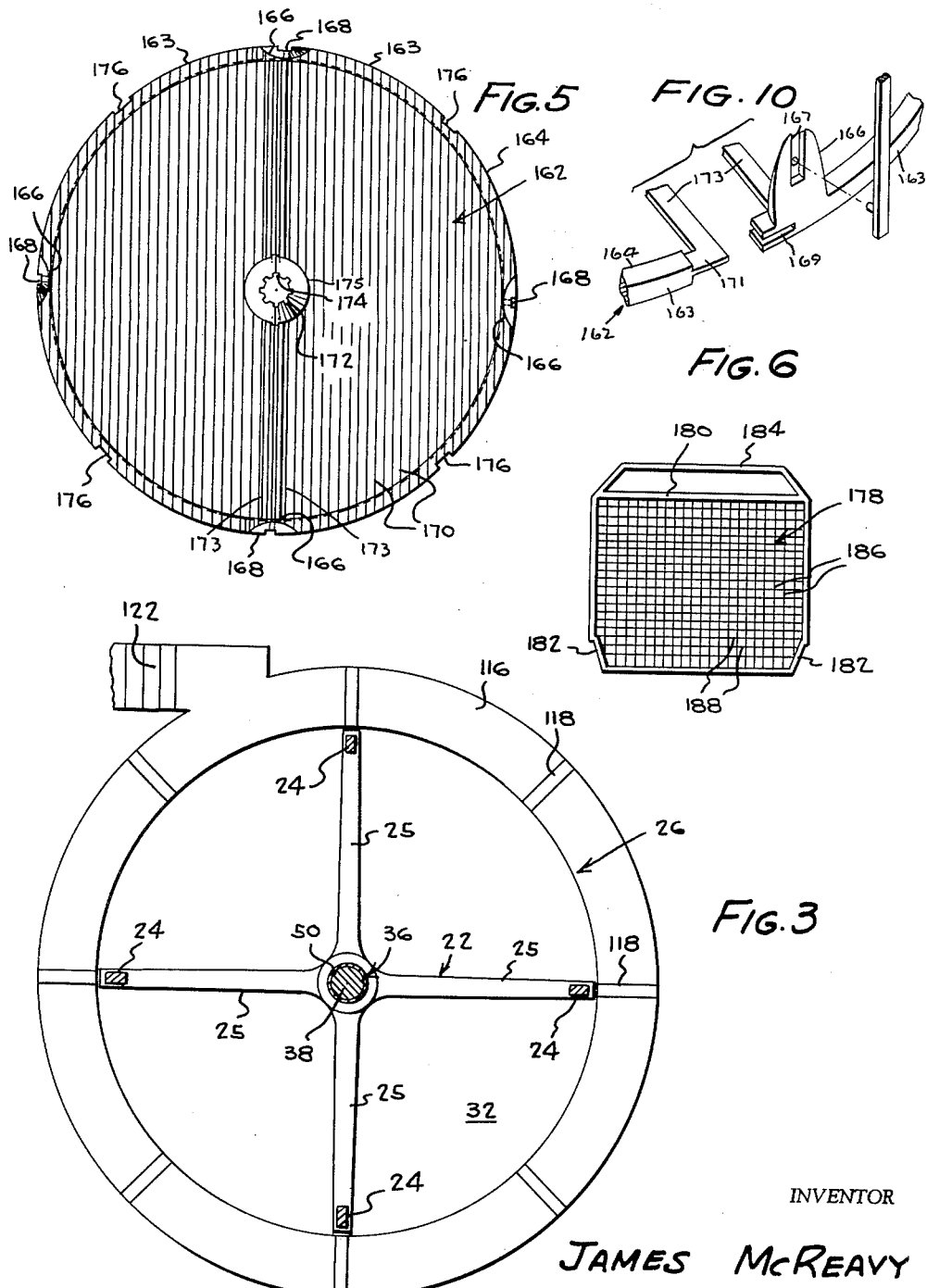
INVENTOR
JAMES McREAVY
BY
McMorrow, Berman + Davidson
ATTORNEYS INVENTOR
JAMES McREAVY Feb. 6, 1962 J. McREAVY 3,019,527
CHEESE MANUFACTURING MACHINE
Filed April 8, 1958 5 Sheets-Sheet 5
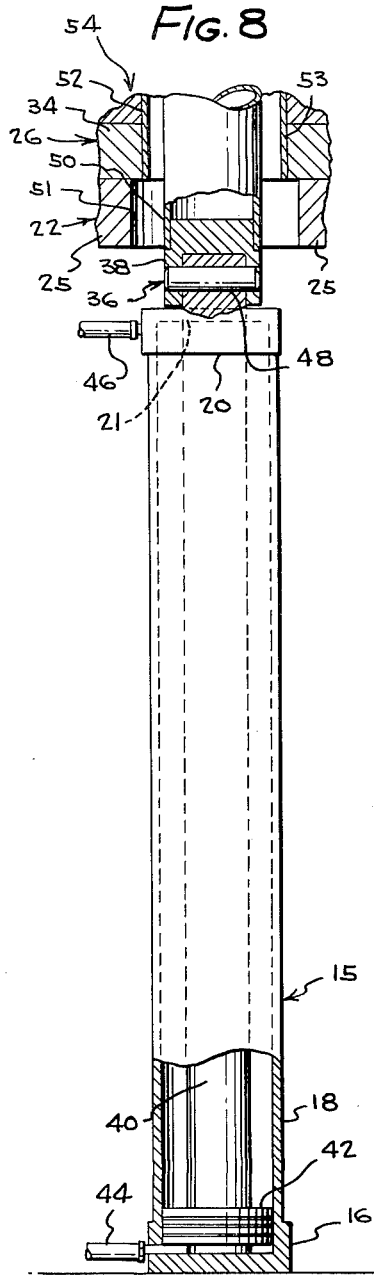
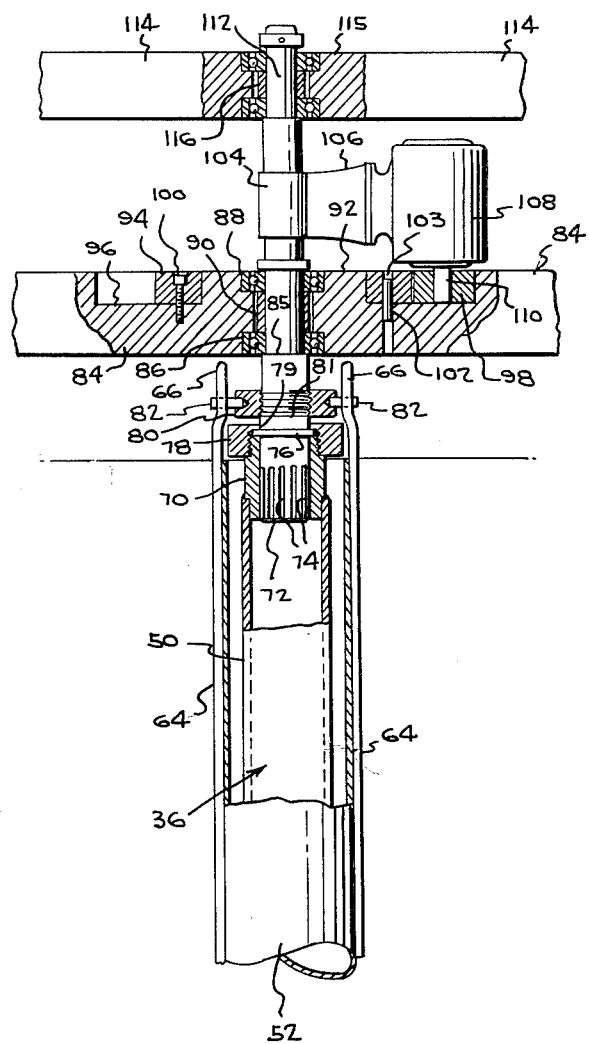
INVENTOR
JAMES McREAVY
BY
McMorrow, Berman & Davidson
ATTORNEYS United States Patent Office 3,019,527
Patented Feb. 6, 1962

3,019,527
CHEESE MANUFACTURING MACHINE
James McReavy, Mancelona, Mich.
Filed Apr. 8, 1958, Ser. No. 727,076
24 Claims. (Cl. 31—48)

This invention relates generally to apparatus used for the commercial production of various types of cheeses, on a large scale.

By way of background, it may be noted that a cheese manufacturing machine is commonly known in the trade as a vat. This is of substantial size. In the art of cheese manufacturing as conventionally practiced, certain disadvantages have been noted in connection with cheese making vats and the processes used for manufacturing cheese when said vats are employed. By reason of the particular construction of said vats, which are generally long, low, and square, a substantial amount of manual labor is involved in present cheese making methods. A worker must be occupied constantly, stirring the curd away from the corners and ends of the vat during the cooking process. Further, blocks of cheese, such as cheddar cheese, must be handled, that is, the curd is cut into blocks, during the manufacture of this type of cheese, and said blocks are turned periodically. Further, the blocks are piled one on top of another, for reasons to be brought out hereinafter. During this process, draining of whey must be effected.

All this requires much manual labor at present, with the worker or workers continually leaning over, lifting heavy blocks during cheddar cheese making, taking unnecessary time for drawing off whey during the processing, and additionally taking excessive time for cleaning between batches.

In view of the above, the main object of the present invention is to provide a generally improved cheese making machine. More particularly, the invention has a number of more specific objects, among which are the following.

To provide a vat formation that is particularly designed to reduce to a marked degree the amount of manual labor involved;

To provide a false bottom of a vat liner, elevatable by a suitable air or hydraulically powered hoist, in a manner to facilitate to a marked degree draining of whey, the convenient handling of blocks of cheese, and the lifting of the curd out of the whey at any stage of the manufacturing process, this characteristic of the machine producing many advantages, among which are vastly improved process and quality control, mechanical removal of processed cheese curd, semi-automatic cleaning after processing a batch, improvement of a uniform acidifying process required for producing cheddar type cheese, continuity of the cooking process, and a general, marked decrease in the amount of manual labor involved;

To provide, generally, a more rapid processing of the cheese, thus producing the highly desirable result of a concurrent, marked increase in production effected by each machine;

To provide a machine which will occupy less floor space in the manufacturing plant than has heretofore been required;

To provide a machine which will have a simple operating principle, thus reducing to a minimum machine failure and "down time," that is, time when a machine is out of operation;

To provide a machine which can have a multiplicity of functions, including use as a pasteurizer if desired;

To so form the machine that the vat can be used as a temporary storage container;

To provide a machine which will have the characteristic of automatic agitation of the batch during the processing, thus producing greater uniformity of the cheese curd; and To permit the manufacture of any type of natural curd cheese in the machine, while not only improving the quality of the cheese, but also the speed with which it can be made.

Summarized briefly, the apparatus comprising the present invention includes a cylindrical, upwardly opening, elevated vat, in which is a liner, which contains the milk. This is enclosed with a metal jacket, so that live steam or hot water may be circulated between the liner and jacket for the purpose of heating the liner contents.

In accordance with the invention, there is a false bottom at the bottom of the liner, freely perforated. Mechanism is incorporated in the invention, extending vertically, centrally of the vat, designed for raising, lowering and/or rotating not only the false bottom but also a plurality of particularly designed cutting knives and cleaning brushes. Disposed above the open top of the vat is an upper set of arms, and a lower set. The upper arms have a connection to the false bottom, so that on operation of the mentioned mechanism, the false bottom will be raised. The lower arms discharge the function of providing suspension means and a rotary motion to a plurality of rigidly attached agitating rods.

Also incorporated in the invention are knives of particular design and movement, that improve the manufacturing process. One of the knives is of circular formation, including cutting wires, said knife being disposed in a horizontal plane and being movable upwardly and downwardly. A second knife is in the form of a rectangular wire frame rigidly secured to and suspended below one of the lower arms, so that as this arm is rotated, the cheese will be cut into slices by the horizontal wires of the second knife. Then, the circular knife, when raised, will cut the slices into cubes, promoting more uniformity of acidity and also promoting draining off of whey.

Other objects will appear from the following description, the claims appended thereto, and from the annexed drawing, in which like reference characters designate like parts throughout the several views, and wherein:

FIGURE 3 is a horizontal section, on the same scale as FIGURE 2, taken substantially on line 3—3 of FIGURE 1;

FIGURE 5 is a top plan view of the circular knife, per se;

FIGURE 6 is an elevational view of the slicing knife, per se;

FIGURE 8 is an enlarged view, partly in elevation and partly in longitudinal section, of the lift cylinder assembly;

Figure 1:
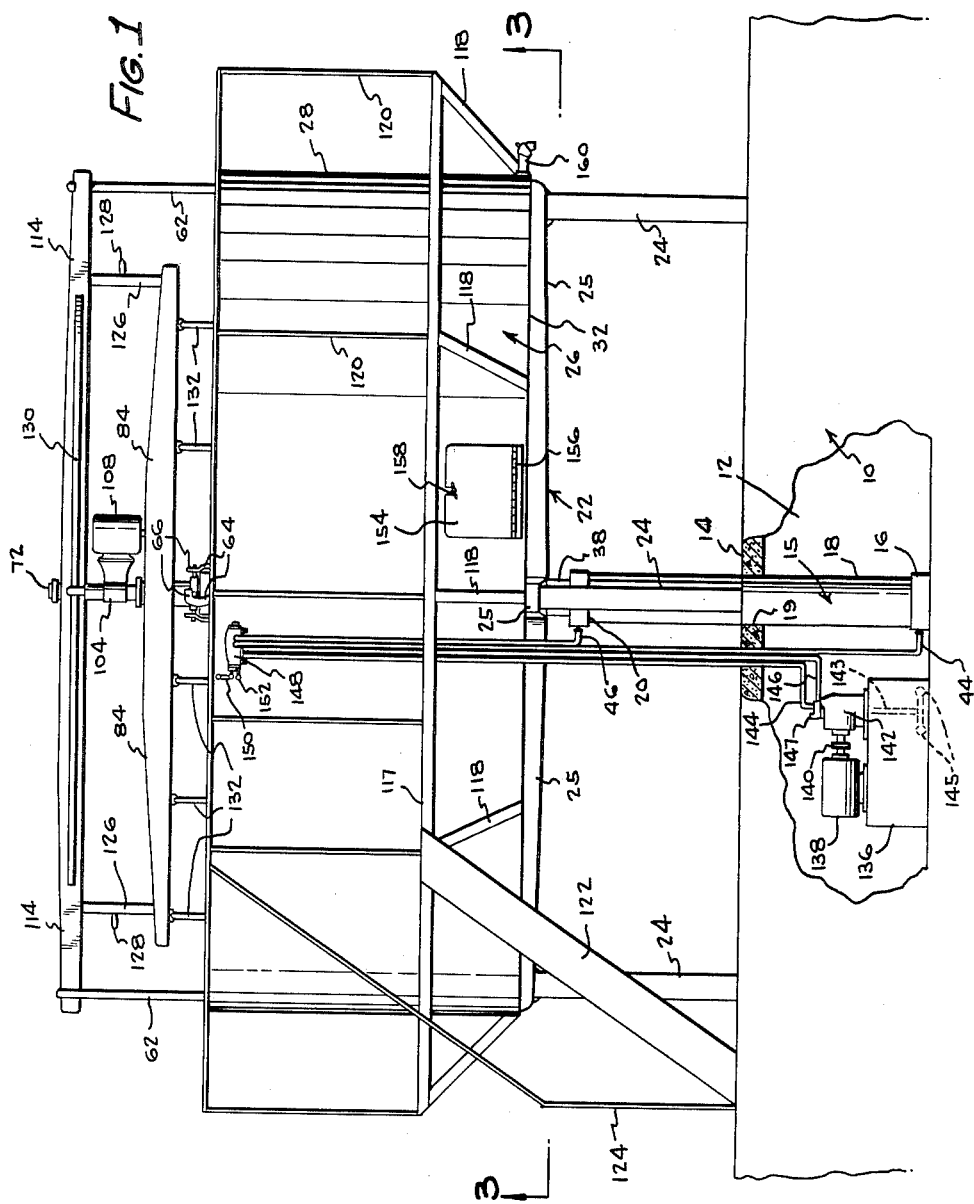
FIGURE 1 is a side elevational view of the cheese making apparatus, a portion of the support surface of the apparatus being broken away to illustrate a pumping assembly incorporated in the structure, said assembly being located in a pit formed in the floor of the manufacturing plant.

FIGURE 9 is an enlarged view partly in elevation and partly in section, showing the upper portion of the axially disposed lifting mechanism, and illustrating the connections of the upper and lower arms thereto, as well as the means for rotating the lower arms; and FIGURE 10 is an enlarged, fragmentary perspective view showing the means for connecting together adjacent sections of the circular knife shown in FIGURE 5.

Referring to the drawing in detail, the reference numeral 10 designates, generally, a support structure on which the apparatus constituting the present invention is mounted. This would constitute a floor of a manufacturing plant, in a typical installation, said floor being provided with a pit 12 roofed over by the floor 14.

Designated generally at 15 is a cylinder assembly, mounted in an upright position upon the bottom surface of the pit, said cylinder assembly including a vertically disposed, elongated, stationary cylinder having a base 16 fixedly mounted upon the floor surface of the pit, and formed integrally with an upstanding cylinder 18 (FIGURES 1 and 8) that extends upwardly through an opening 19 formed in the floor 14.

Cylinder 18 is provided at its upper end with an upper end cap or top wall 20, having a center opening 21 (FIGURE 8) in which is vertically slidable a ram or piston rod, to be described hereinafter. In this connection, it will be understood that there has been no attempt in the drawing to illustrate packing glands, stuffing boxes, etc. It will be understood, of course, that wherever leak-proof joints are needed, these will be provided, all this being considered sufficiently obvious as not to require special illustration herein.

This completes the lift cylinder assembly. Turning now to the vat structure, the invention includes a support frame for the vat, said support frame being generally designated at 22.

The support frame is designed to stationarily mount the vat in an elevated position above the floor 14. To this end, the frame includes angularly spaced, vertically disposed support legs 24 fixedly mounted upon the floor and extending upwardly therefrom to a location a short distance above the upper end of the lift cylinder assembly 15. In the illustrated example, four legs 24 are provided (FIGURE 1), and at their upper ends, these are fixedly secured to the outer ends of horizontally disposed support arms 25. Referring to FIGURES 1 and 3, arms 25 are disposed in a common horizontal plane, and are integrally or otherwise rigidly connected at their center, at positions angularly spaced 90 degrees apart from the center, the several arms radiating from the center to provide a cruciform support for the vat, which has been generally designated at 26.

The vat is a large-diameter, cylindrically shaped tank wholly open at its top and disposed in co-axial relation to the cylinder assembly 15. The bottom wall of the tank is fixedly mounted upon the arms 25, and as will be described hereinafter, the tank is surrounded by a catwalk, to permit access to the interior thereof.

The tank is of hollow-walled construction throughout, to permit circulation of live steam or hot water in the wall cavity, for the purpose of heating the contents of the vat. Thus, and referring particularly to FIGURE 7, the tank includes an outer side wall or jacket 28 and an inner side wall or liner 30, spaced from the jacket to provide a chamber 31 therebetween through which the heating medium is circulated. Of course, the chamber 31 is wholly closed at its upper end, and referring to FIGURE 7, jacket 28 includes a bottom wall 32, while liner 30 includes a bottom wall 33 spaced upwardly from the wall 32 so that said medium may circulate therebetween. The hollow bottom of the vat is centrally apertured, and mounted in the center opening of said hollow bottom is a circular, comparatively thick block 34. Radiating from the block, in the space between the bottom walls 32, 33 are filler pieces or strips 35, providing spacers between walls 32, 33 to prevent collapse thereof. Of course, the strips or spacer members 35 are so arranged as to not interfere with the free circulation of the heating medium within the tank jacket.

Figure 7:
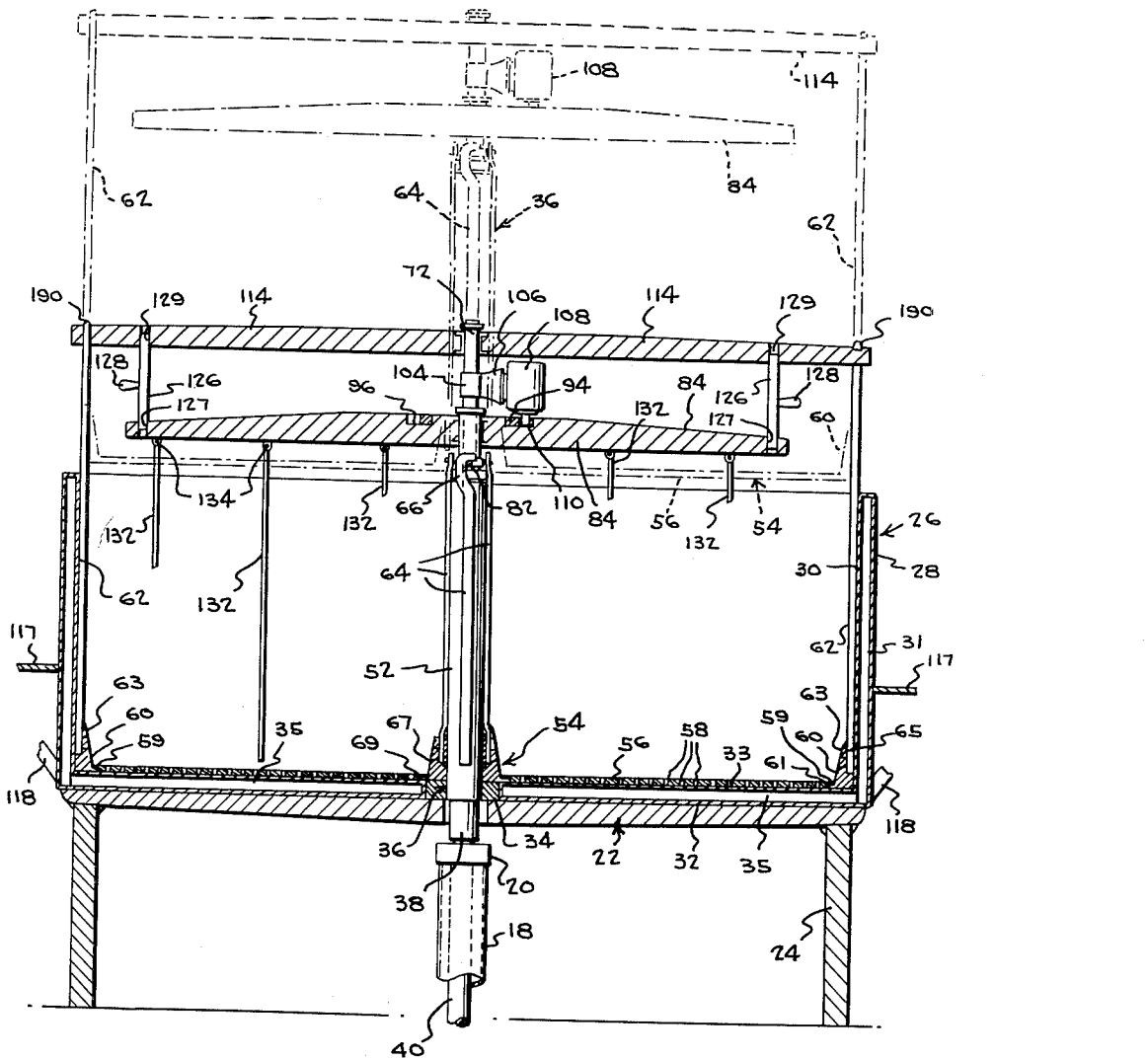
FIGURE 7 is an enlarged vertical sectional view taken diametrically through the apparatus, the elevatable components of the assembly being shown in full and dotted lines in lowered and raised positions, respectively.

Designated generally at 36 is the ram or piston assembly of the apparatus, that is, the assembly that is elevatable axially of the vat, between the full and dotted line positions shown in FIGURE 7, responsive to the application of fluid pressure thereto within cylinder assembly 15.

The piston assembly 36 includes a connector block 38 (FIGURE 8), having an underside recessed to receive the upper end of an elongated piston member 40 on the lower end of which is a piston 42. Fluid pressure is supplied to cylinder 18 below piston 42 through a conduit 44, for elevating assembly 36, and pressure is similarly supplied through a tube 46 connected with the upper end of the cylinder 18, during the lowering of the assembly 36.

The block 38 is pinned as at 48 to the upper end of the piston member 40. Block 38 is secured to and plugs the lower end of a tubular piston extension 50 positioned through a center opening 51 of the support frame (see FIGURE 8). Piston extension 50 extends upwardly within (see FIGURE 9) a stationarily mounted, cylindrical, tubular, piston extension housing 52, fixedly engaged at its lower end (see FIGURES 7 and 8) in a center opening 53 of block 34. Housing 52 rises to a height at least as great as that of the vat itself, the purpose of said housing being to prevent contact between the piston extension 50 or any other portion of the elevated apparatus, and the cheese.

Figure 4:
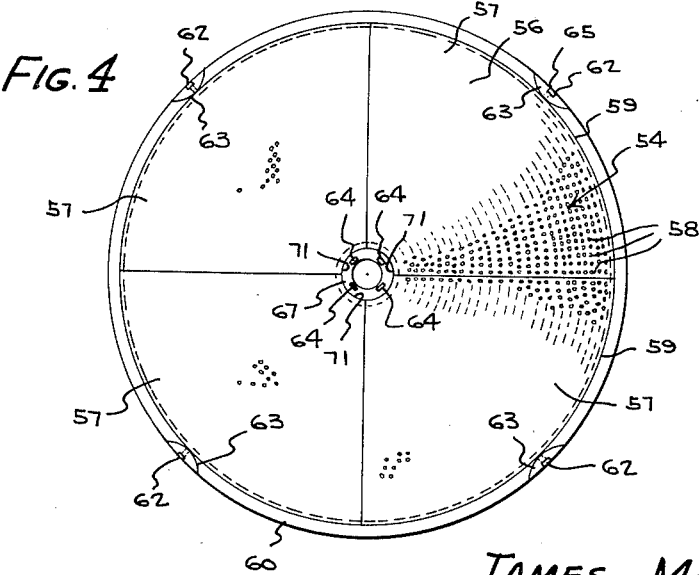
FIGURE 4 is a top plan view of the false bottom or elevatable foraminous plate, per se.

Carried by the piston assembly 36 is a false bottom generally designated at 54 and illustrated per se in FIGURE 4. This includes a flat, circular plate 56, freely perforated as at 58 over its entire area. The plate, as shown in FIGURE 4, is comprised of four segments 57, each of quadrantal shape. The segments 57, at their outer arcuate edges, have flanges 59 (see FIGURES 4 and 7), supported by an inwardly directed flange 61 formed upon the inside edge of an outer support ring 60. Ring 60, at uniformly spaced intervals about the circumference thereof, is formed with upwardly directed projections 63, and these are formed with upwardly opening recesses 65 in which are pinned the lower ends of vertical outer lift rods 62.

A small diameter inner lift ring 67 is of upwardly tapering formation, and is formed with a center opening snugly receiving the stationary, upright piston extension housing 52. Ring 67 slides freely upon the housing 52, during the up and down movement of the false bottom between the opposite extreme positions thereof shown in full and dotted lines in FIGURE 7.

The inner ring 67 is formed with an outwardly directed flange 69, underlying a complementary flanged edge portion provided at the apex portions, that is, along the inner edges 71 (see FIGURE 4) of the segments 57 of the false bottom.

Ring 67 is provided with upwardly opening recesses in which are pinned the lower ends of inner lift rods 64. These are angularly spaced 90 degrees apart about the circumference of the housing 52, and slide upon the housing during their up and down movement between the full and dotted line positions of FIGURE 7.

At their upper ends, the inner lift rods 64 are formed with hook portions 66.

This completes the formation of the false bottom, said bottom comprising, as will be apparent, the parts 56 through 66.

Reverting now to the piston assembly 36, this includes a connector block or sleeve 70 (FIGURE 9) welded to the upper end of the piston extension 50. The connecting sleeve 70 is internally splined, and complementary splines 74 are provided upon the lower end portion of a spindle or standard 72, to hold the standard and connector sleeve against relative rotation. Standard 72 is formed with a circumferential collar 76 bearing against the upper end of sleeve 70 (see FIGURE 9) and a nut 78 is threaded upon a reduced, complementarily threaded axial extension of the sleeve, and is formed with an inwardly directed flange 79 bearing against the collar, thus to fixedly secure the sleeve and standard to one another.

A ring 80 is supported upon a shoulder 81 of the spindle 72, and engaged in and projecting radially outwardly from the ring 80 are pins 82 that are engaged with the hooked end portions 66 of the inner lift rods 64.

Figure 2:
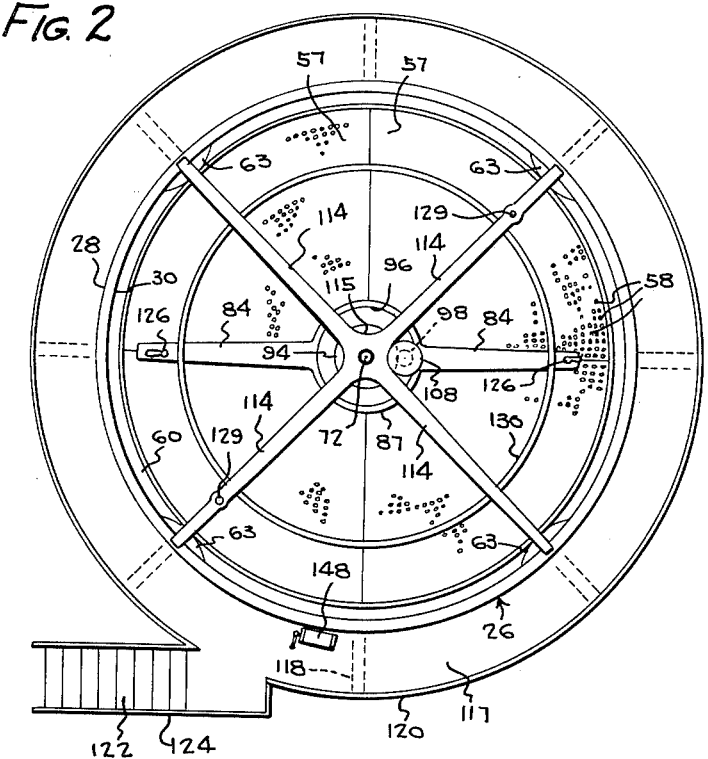
FIGURE 2 is a top plan view of the cheese making machine, on a reduced scale.

A set of lower arms 84 is rotatably supported upon the spindle 72, upon a shoulder 85 of the spindle. A ball bearing means is interposed between the spindle and the hub portion of the arms, that is, the arms are aligned with one another diametrically of the apparatus (see FIGURE 2), and are integrally connected to a hub portion 87 (see FIGURE 2). The hub portion is centrally apertured, and mounted in the center opening of the hub portion are lower and upper bearings 86, 88, disposed in abutting relation to a bushing or liner 90.

A low, circular center boss 92 of hub 87 (FIGURE 9) receives a ring gear 94, within an upwardly opening, shallow recess 96 formed in the top surface of the hub. Ring gear 94 is in mesh with a spur gear 98, and the ring gear is pinned to the hub for rotation therewith, by pins 102 engaged in openings of the hub and projecting upwardly within the recess 96 so as to be received in openings 103 formed in the ring gear. The ring gear is connected by a bolt 100 to the hub. Thus, after connection of the ring gear to the hub by the bolt, it will be held down upon the hub, the several pins 102 and the bolt being adapted to hold the ring gear to the hub for rotation therewith.

Obviously, one might if desired, use a shear pin connection between the ring gear and hub, so that in the event the resistance to rotation offered by the hub to the source of power exceeds a predetermined value, thereby placing excessive load upon the drive means of the hub, the pins will shear, allowing free rotation of the ring gear in respect to the hub before any damage can result to the drive means.

The drive gear 98 is powered by a vertically disposed motor 108, said drive gear being keyed to the shaft 110 of the motor. The motor is supported upon a bracket 106, said bracket having a sleeve 104 receiving the reduced upper end portion of the spindle, said sleeve being fixedly secured to the spindle in any suitable manner.

At its upper end, the spindle has a shoulder 112, supporting an upper set of arms 114. The arms 114 (see FIGURE 2) radiate from a hub 115, at locations angularly spaced 90 degrees apart, providing a spider, which is freely rotatable upon the spindle, said hub 115 having bearing means 116 (FIGURE 9) to allow said free rotation of the spider.

It will be understood that the piston assembly 36 includes the spindle, said spindle providing means on which the lower set of arms and the upper set of arms may freely rotate, the spindle further serving as a support for the drive motor 108 used for rotating the lower set of arms.

As previously noted herein, a catwalk is provided for the purpose of facilitating access to the interior of the vat. The catwalk has been shown to best advantage in FIGURES 1, 2 and 3, and includes a platform 117 extending about the vat, and braced in position by upwardly, outwardly extending braces 118, secured fixedly to and uniformly spaced about the vat supporting structure or frame 22. A guard rail 120 is provided on the outer circumference of the platform 117, and access to the platform is afforded through the medium of a stairway 122 having a guard rail 124.

The upper and lower arms are connected for conjoint rotation by vertical connector bars 126 (FIGURE 1) that are provided intermediate their ends with radially outwardly extending handles 128, to facilitate manual rotation of the upper and lower sets of arms as necessary, when the power of the drive motor is shut off. Ordinarily the rotating arm 84 and lifting arm 114 are not engaged.

In any event, and referring to FIGURE 7, arms 84 and 114 have registering openings 127, 129, respectively, the power transfer or connecting rods 126 being fixedly engaged in the openings 127, and being removably engaged in the openings 129. As will be noted from FIGURE 2, the arms 114 are offset angularly from the arms 84, so that the openings 129 are out of register with the arms or rods 126. This is merely for the purpose of showing as many details of construction as possible, and it will be understood that ordinarily, those arms 114 having openings 129 would be aligned with the arms 84 so as to receive the connecting rods 126.

Bracing the several arms 114 adjacent their outer ends is a brace ring 130 (FIGURE 2) extending through all of the arms 114.

Extending vertically downwardly from the arms 84, at a plurality of locations uniformly spaced longitudinally of the respective arms (see FIGURE 1) are vertical agitating rods 132. These would terminate in close proximity to the false bottom, and are rigidly secured to the arms 84, through the provision of brackets 134. It may be noted that the rods 132 of one arm 84 are staggered longitudinally of said arm in respect to the rods 132 of the other arm, thus to insure that the agitating rods will move through the greatest number of paths, through the cheese that is being manufactured.

Referring now to FIGURE 1, supported upon a reservoir 136 for pressure fluid such as oil, is a pump drive motor 138, having a flexible coupling 140 to the input shaft of a pump 142. Pump 142 is adapted to pump pressure fluid out of reservoir 136, said fluid being drawn upwardly through a line 143, said line having branches at its inlet end and said branches being provided with filters 145.

Designated at 147 is a pressure relief valve, in the intake or supply line 146 of the pressure fluid system. Line 146 extends to a selector valve 148, having handles 150, 152 conveniently disposed for a workman standing upon the platform.

A return line 144 extends from the selector valve, back into the reservoir 136.

The lines 44, 46 extending to the lower and upper ends, respectively, of the cylinder 18 both extend from the selector valve, so that it will be understood that by selective operation of the valve, fluid can be supplied under pressure to either the line 44 or the line 46, depending upon whether the piston assembly is to be raised or lowered.

To provide access to the interior of the vat, as for example for cleaning purposes, there is utilized a hinged access door 154, hinged at 156 upon the jacket 28 and normally, sealably engaged in closed position by a latch 158. It would be understood that the door arrangement is such as to permit insertion of an auger, not shown, into the vat for the purpose of drawing off the cheees curds. The auger can thus be inserted and withdrawn mechanically and without exposure to air or contamination.

Designated at 160 is a spigot, provided at the base of the vat for the purpose of drawing off whey. A pipe can be connected to said spigot, for disposal of the drained material.

Referring now to FIGURE 5, there is here shown a circular knife generally designated at 162, and formed to a diameter equal to that of the false bottom. This is formed of two separably connected half-sections 163. Knife 162 is provided with the same suspension arm arrangement as is provided for the false bottom, that is, the arcuate edges of sections 163 cooperate to define an annular frame 164 formed at 90 degree intervals with upstanding projections 166 analogous to the projections 63 of the false bottom outer ring 60. Projections 166 have upwardly opening recesses 167, in which are pinned the lower ends of cutting knife outer lift rods 168. Each section has a projection 166 medially between its ends, and another projection at one end. The end having the projection has a recess 169. This receives a tongue 171 defined by the end of a straight inner frame member 173 of the other section. Each section, thus, has a recess 169 at one end and a tongue 171 at the other end.

Over the entire area of the circular knife, there are provided closely spaced, thin but strong cutting wires 170, tensioned across the frame 164. Further, the circular cutting knife has a hub or inner ring 172, adapted to fit about the inner ring 67. Ring 172 is formed with inwardly facing, uniformly spaced recesses selected ones of which slidably receive the lift rods 64, said recesses being designated at 174 in FIGURE 5. The hub is composed of complementary, semi-circular sections 175 rigid with the members 173.

Alternating with the projections 166, and uniformly spaced 90 degrees apart about the frame 164 are outwardly opening recesses 176 in which are slidably received the lift arms 62 of the false bottom.

The illustrated sectional, separable knife construction is to permit assembly and disassembly of the same without interfering with or being interfered with by the remaining components of the apparatus. Other separable, sectional, or removable arrangements for the knife could be used if desired.

In FIGURE 6 there is shown a second knife generally designated at 178. This includes a rectangular frame 180, which may have lower corners diagonally cut away as at 182. A hanger bar 184 is formed on the upper end of the frame, and tensioned across the frame are vertical cutting wires 186 and horizontal cutting wires 188.

In the illustrated embodiment, there are no crossing wires on the circular knife, and as a result, said knife would be used for cutting the cheese into slices. Crossing wires are provided on the knife of FIGURE 6, so that this knife would be used for cutting the slices into cubes.

Operation

As a first step in the manufacture of cheese by means of the illustrated apparatus, one operates the hydraulic pressure means including the pump, selector valve, etc., to elevate the piston assembly 36 to the dotted line position shown in FIGURE 7. This brings the false bottom 54 to the top of the vat. The circular curd-cutting knife 162 is then placed directly upon the false bottom, with its lift rods 168 upright but not at this time fastened to the lifting arm 114. The false bottom and the knife 162 are then lowered together into the liner 30, to the full line position shown in FIGURE 7. In this connection, the knife 162 has not been shown in FIGURE 7, but would be supported directly upon the false bottom.

Milk is then piped into the liner, cultures and coloring ingredients are added, steam or hot water is injected into the vat jacket and maintained in circulation therein, and thus the cheese making process begins. The agitator rods 132 are all attached to the arms 84, and revolve at slow speed within the milk as the process begins.

When the proper degree of acidity is reached, rennet is added and the agitators 132 are stopped for about fifteen minutes to allow coagulation of the milk into curds. At this point, it will be understood that the rotation of the agitators in circular paths within the milk is accomplished by operation of the drive motor 108, which drives the spur gear 98, causing rotation of the ring gear 94 and hence of the arms 84.

In any event, while the rennet is acting upon the milk to establish coagulation, the hydraulic lift mechanism is once again operated to raise the false bottom to the top of the vat. This allows milk in the perforations 58, and also milk under the false bottom, to be coagulated with the bulk of the milk in the vat.

The worker now removes the agitator rods 132 and installs in their place the upright curd knife 178. This is designed for attachment rigidly to selected brackets 134 of an arm 84.

The assembly is once again lowered to the bottom of the vat liner, and the lifting arms of the false bottom are now disengaged at their upper ends from the several arms 114. This is facilitated by reason of the fact that the arms 62 at their upper ends have hooked portions 190 (FIGURE 7) engaging over the arms 114.

The lift rods 168 of the circular curd knife are now hooked over the arms 114, in place of the disengaged lift rods 62. Therefore, any elevation of the piston assembly that now occurs will lift only the circular curd knife, but not the false bottom.

When the milk has fully coagulated, and the curd has reached the proper stage of acidity, the upright or rotating curd knife is rotated about the lifting piston assembly, thus making the first cut. Then the piston assembly is elevated, thus raising the circular curd knife through the mass of sliced curd and completing the cutting of the curd.

With the piston assembly remaining in elevated position at the end of the cutting operation, the operator now removes the curd knives and replaces the agitator tools upon the power operated arm 84. The agitator tools or rods 132, once again suspended from and rigidly attached to the arms 84, are lowered into the vat, and the false bottom lifting straps or rods 62 are once again engaged with the upper arms 114.

Agitation is now resumed and continued during the cooking period.

When the cheese curd and whey have reached the proper stage of acidity, the false bottom is raised, thus lifting the curd out of the whey. The whey is then rapidly drawn off through the spigot. Agitation can be continued while the whey is being drawn off, to keep the curd from matting. This is the process for manufacture of Colby type cheese.

When cheddar cheese is being manufactured, the curd is allowed to lie still upon the false bottom, after the whey is drained off. The curd therefore mats and when matted, is cut into blocks. The blocks are turned periodically, and also piled one upon another until all the whey is pressed out of the blocks and what is called "dry" acid development obtained. Then the curd is milled by feeding the slabs into a curd mill which cuts it into small pieces. The curd is then ready for salting and washing off of the brine.

The operation described above can be done with much more facility, using the apparatus of the invention, than has heretofore been possible. This is so because the false bottom facilitates straining and the hydraulic lifting means with the false bottom enables the block to be worked at a height far more convenient for the worker. The false bottom, in other words, can be raised to any height desired, during this particular operation.

It is worthy of note that both the Colby and cheddar processes can be improved by the rapid draining off of the whey. The finished product can be emptied through the bottom of the vat directly into curing molds, aided by the auger arrangement referred to above, and further aided by the false bottom and the rotation of tools attached to the arm of the lifting mechanism. The liner, further, may be cleaned mechanically by brushes attached to the same arms 84, and the false bottom can be cleaned by steam jets issuing from nozzles carried by the arms. Cleaning water and residue may all be flushed out the bottom drain, so that the vat is swiftly made ready for a new batch.

Many of the advantages of the invention will be self-apparent, from the description which has been provided hereinabove, considered in relation to the stated objects and the discussion of the background of the invention. However, at this point it may be noted that the false bottom, serving as a curd screen, permits the curd to be lifted out of the whey at any stage of the manufacturing process, for a high amount of process and quality control. Further, the use of a hydraulic lifting mechanism (this could of course be a pneumatically powered mechanism), adapted to the process in the form of a centrally disposed lift, eliminates as much as 50 percent of the manual labor involved in present cheese making methods. Such methods require unnecessary time for drawing off the whey, or cleaning between batches, and require the constant services of a worker, stirring the curd away from the corners and ends of the vat. Further, a completely uniform and highly effective agitator and cutting action is effected, through the use of a power driven agitation means, and cutting means.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claims.

What is claimed is:

1. Apparatus for manufacturing cheese comprising a vat; a perforated false bottom mounted therein for up-and-down movement; means mounted in the vat connected with and adapted for raising and lowering said false bottom; a rotary support mounted on the vat; means carried by the first named means having a driving connection with the support for rotating said support; and agitator means carried by said support and extending into the vat.

2. Apparatus for manufacturing cheese comprising a vat; a perforated false bottom mounted therein for up-and-down movement; means mounted in the vat connected with and adapted for raising and lowering said false bottom; a rotary support mounted on the vat; means carried by the first named means having a driving connection with the support for rotating said support; and agitator means carried by said support and extending into the vat, comprising a plurality of rods depending vertically from said support at different distances from the axis of rotation of the support, for travel of said rod through a plurality of concentric, circular paths.

3. Apparatus for manufacturing cheese comprising a vat; a perforated false bottom mounted therein for up-and-down movement; means mounted in the vat connected with and adapted for raising and lowering said false bottom; a rotary support mounted on the vat; means carried by the first named means having a driving connection with the support for rotating said support; and agitator means carried by said support and extending into the vat, said vat having a side wall and a bottom hollow over their entire areas and adapted for the circulation of a fluid heating medium therethrough.

4. Apparatus for manufacturing cheese comprising a vat; a perforated false bottom mounted therein for up-and-down movement; means mounted in the vat connected with and adapted for raising and lowering said false bottom; a rotary support mounted on the vat; means carried by the first named means having a driving connection with the support for rotating said support; and agitator means carried by said support and extending into the vat, said rotary support comprising a plurality of arms radiating from the center of the vat.

5. Apparatus for manufacturing cheese comprising a vat; a perforated false bottom mounted therein for up-and-down movement; means mounted in the vat connected with and adapted for raising and lowering said false bottom; a rotary support mounted on the vat; means carried by the first named means having a driving connection with the support for rotating said support; and agitator means carried by said support and extending into the vat, said rotary support comprising a plurality of arms radiating from the center of the vat, said arms being supported for rotation upon the first named means.

6. Apparatus for manufacturing cheese comprising a vat; a perforated false bottom mounted therein for up-and-down movement; means for raising and lowering said false bottom; a rotary support mounted on the vat; means for rotating said support; and agitator means carried by said support and extending into the vat, said rotary support comprising a plurality of arms radiating from the center of the vat, said arms being supported for rotation upon the first named means, said first named means comprising a cylinder and piston assembly vertically disposed in a centered position within the vat, the cylinder being stationarily mounted, said piston assembly at its upper end being formed as a spindle on which said arms are rotatably carried.

7. Apparatus for manufacturing cheese comprising a cylindrical, upwardly opening vat; a horizontal, circular, freely perforated false bottom mounted within the vat for vertical movement between the bottom and top of the vat; means mounted in the vat connected with and adapted for raising and lowering said false bottom; a rotary support mounted on the vat; means carried by the first named means having a driving connection with the support for rotating said support; and agitator means carried by said support and extending into the vat.

8. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; means on the piston assembly for rotating said support structure; and agitating means removably suspended from said support structure within the vat.

9. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; a drive motor carried by the piston assembly; a drive gear rotated by said motor; a ring gear connected to the support structure for rotation therewith and meshing with the drive motor, whereby to effect rotation of said support structure; and agitating means removably suspended from said support structure within the vat.

10. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; a drive motor carried by the piston assembly; a drive gear rotated by said motor; a ring gear connected to the support structure for rotation therewith and meshing with the drive motor, whereby to effect rotation of said support structure; and agitating means removably suspended from said support structure within the vat, said support structure being rotatable upon the piston assembly independently of the extension and retraction of said assembly.

11. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; a drive motor carried by the piston assembly; a drive gear rotated by said motor; a ring gear connected to the support structure for rotation therewith and meshing with the drive motor, whereby to effect rotation of said support structure; and agitating means removably suspended from said support structure within the vat, the support structure including an upper set of arms and a lower set of arms, said false bottom having detachable connections at its periphery to the upper set of arms, the lower set of arms carrying said agitating means.

12. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; a drive motor carried by the piston assembly; a drive gear rotated by said motor; a ring gear connected to the support structure for rotation therewith and meshing with the drive motor, whereby to effect rotation of said support structure; and agitating means removably suspended from said support structure within the vat, the support structure including an upper set of arms and a lower set of arms, said false bottom having detachable connections at its periphery to the upper set of arms, the lower set of arms carrying said agitating means, said upper and lower sets of arms rotating in parallel planes about the axis of said piston assembly.

13. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; a drive motor carried by the piston assembly; a drive gear rotated by said motor; a ring gear connected to the support structure for rotation therewith and meshing with the drive motor, whereby to effect rotation of said support structure; and agitating means removably suspended from said support structure within the vat, the support structure including an upper set of arms and a lower set of arms, said false bottom having detachable connections at its periphery to the upper set of arms, the lower set of arms carrying said agitating means, said upper and lower sets of arms rotating in parallel planes about the axis of said piston assembly, and having a separable connection joining the same for conjoint rotatable movement.

14. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; a drive motor carried by the piston assembly; a drive gear rotated by said motor; a ring gear connected to the support structure for rotation therewith and meshing with the drive motor, whereby to effect rotation of said support structure; and cheese working means removably suspended from said support structure within the vat, the support structure including an upper set of arms and a lower set of arms, said false bottom having detachable connections at its periphery to the upper set of arms, the lower set of arms carrying said cheese working means, said upper and lower sets of arms rotating in parallel planes about the axis of said piston assembly, and having a separable connection joining the same for conjoint rotatable movement, the cheese working means including a flat knife depending from and having detachable connections to the lower set of arms, said knife being disposed in a plane perpendicular to the plane of the false bottom, said knife including a frame extending peripherally thereof and a plurality of wires connected to and bounded by the claim.

15. Apparatus for manufacturing cheese comprising a cylindrical, upwardly opening vat; a horizontal, circular, freely perforated false bottom mounted therein for vertical movement between the bottom and top of the vat; a vertically extendable piston assembly mounted centrally within the vat; a rotary support structure carried by said piston assembly; means on the piston assembly for rotating said support structure; and agitating means removably suspended from said support structure within the vat, said agitating means comprising a plurality of groups of vertical rods depending from said support structure, each group extending radially of the support structure, said groups being angularly spaced about the support structure, the rods of one group being staggered in a direction radially of the support structure in respect to the rods of a second group.

16. Apparatus for manufacturing cheese comprising a vat; a perforated false bottom mounted therein for up and down movement; means mounted in the vat connected with and adapted for raising and lowering said false bottom; a rotary support mounted on the vat; means carried by the first named means having a driving connection with the support for rotating said support; and means carried by said support and extending into the vat, disposed in position for passage through the vat contents.

17. Apparatus for manufacturing cheese comprising a vat, a pair of beam supports extending crosswise of the vat and arranged on a standard for rotation and for movement to and from the vat above the top opening thereof, a planiform, open-work, cheese working tool suspended from one of said supports and being substantially co-extensive with the bottom area of the vat, and cheese-working means suspended from the other of said supports.

18. An apparatus as in claim 17, said tool comprising a foraminated disk.

19. An apparatus as in claim 17, said tool comprising a foraminated disk supported on hangers located near the outer wall and near the center of said vat, respectively.

20. An apparatus as in claim 17, said tool comprising a ring having a series of spaced, parallel, cheese-cutting wires.

21. An apparatus as in claim 17, said means comprising a series of depending stirring rods, in spaced relation radially of the vat.

22. An apparatus as in claim 17, said means comprising a frame having a network of crossing wires defining polygonal apertures, said frame lying in a radial plane with respect to the vat axis.

23. An apparatus in claim 17, said tool comprising a foraminated disk, and said means comprising a series of depending stirring rods, in spaced relation radially of the vat.

24. An apparatus as in claim 17, said tool comprising a ring having a series of spaced, parallel, cheese-cutting wires, and said means comprising a frame having a network of crossing wires defining polygonal apertures, said frame lying in a radial plane with respect to the vat axis.

References Cited in the file of this patent
UNITED STATES PATENTS

| | | |
|---|---|---|
| 1,046,906 | Veeman | Dec. 10, 1912 |
| 1,198,529 | Dowling | Sept. 19, 1916 |